F. C. & C. E. SMITH.
SOLDER-CUTTING MACHINE.
No. 181,367. Patented Aug. 22, 1876.
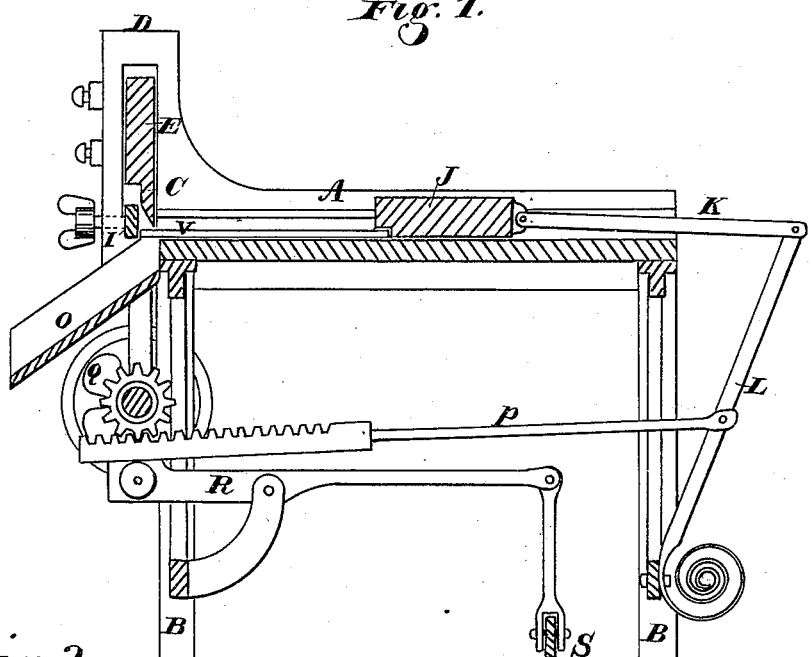
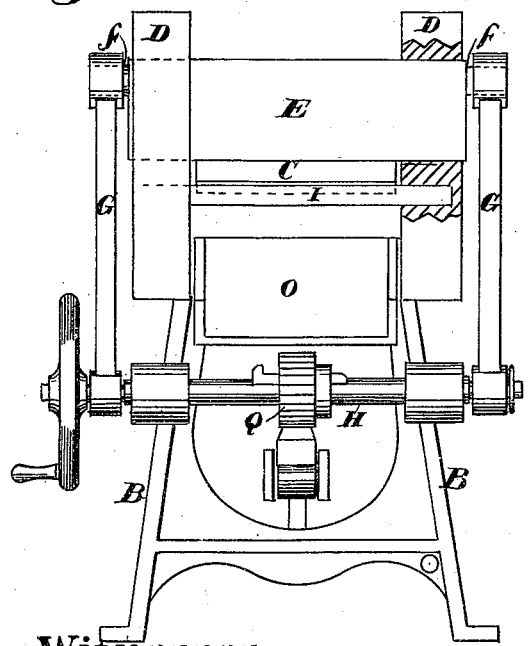
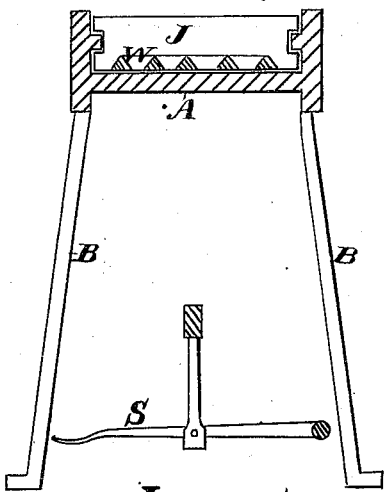
Witnesses
Geo. H. Strong
Jno. L. Boone
Inventors
Ferdinand C. Smith
Charles E. Smith
by Dewey & Co.
Atty.

UNITED STATES PATENT OFFICE.

FERDINAND C. SMITH AND CHARLES E. SMITH, OF PORTLAND, OREGON.

IMPROVEMENT IN SOLDER-CUTTING MACHINES.

Specification forming part of Letters Patent No. 181,367, dated August 22, 1876; application filed June 21, 1876.

*To all whom it may concern:*

Be it known that we, FERDINAND C. SMITH and CHARLES E. SMITH, both of Portland, State of Oregon, have invented an Improved Solder-Cutting Machine; and we do hereby declare the following description and accompanying drawings are sufficient to enable any person skilled in the art or science to which it most nearly appertains to make and use our said invention without further invention or experiment.

Our invention relates to an improved machine for cutting bars or rods of solder into small pieces or pellets, such as are now much used by tinners for convenience in soldering joints. It also relates to certain improvements in casting the solder in order to adapt it to the machine and expedite the work.

Referring to the accompanying drawing, Figure 1 is a longitudinal section of our machine. Fig. 2 is a front view. Fig. 3 is a transverse section.

Let A represent a box, which is mounted upon suitable legs B B, and which has a knife or cutter, C, operated vertically across one end, similar to an ordinary straw-cutting machine. The sides of the box at one end are extended upward, so as to form standards D D. Each of these standards has a vertical slot extending nearly its entire length, and a head, E, extends across between the standards, its opposite ends moving in the slots. The knife or cutter C is secured to the lower inside edge of this head. An arm, *f*, of this head extends through to the outside of each standard, and a connecting-rod, G, connects these arms with eccentrics on the driving-shaft H below, so that when the shaft is rotated the head and knife will be caused to move up and down in the slots. A bar, I, extends across between the two standards just below the head, and serves as a stop and gage to regulate the length of the piece of solder to be cut from the bar or bars. A block or follower, J, is arranged to slide upon longitudinal ways inside of the box A. A rod, K, at one end hinged to the rear end of the block extends back far enough to have its opposite end hinged to the upper end of a spring-lever, L, at the rear end of the box. The action of this spring-lever is such as will force the block J forward toward the front end of the box.

In order to adjust the bars or rods of solder to be cut upon the bottom of the box in front of the block J we force the follower toward the rear end of the box, and drop the bars or rods in front of it, so that the pressure of the spring-lever and follower-block against the rear ends will press their forward ends under the knife or cutter against the stop-bar I. The knife then descends and cuts a short length from their front ends, and as the knife moves up again the spring and follower will force the bars forward again against the stop-bar while the clipped pieces are directed by an apron or chute, O, into a receptacle placed to receive them. In order to conveniently withdraw the follower-block to the rear end of the box after one set of bars or rods are cut up I attach one end of a bar, P, to the spring-lever L near its middle. This bar extends forward underneath the box, so that its front end passes below a spur-wheel, Q, which is fixed on the driving-shaft H. The forward end of this bar is formed into a rack, which will engage with the spur-wheel Q, when it is raised up against it. This end of the bar rests in a seat, which is formed on one end of a centrally-pivoted lever, R, while the opposite end of the lever is connected with a treadle, S, which is within easy reach of the foot of the operator. It will therefore be evident that when the treadle is depressed by the foot of the operator the rack-bar will be raised into engagement with the spur-wheel Q, when the rotation of the crank-shaft will force the rack-bar P, spring-lever L, and follower-block J toward the rear, so that a new set of rods or bars can be dropped in front of the block. The pressure upon the treadles then being removed the block will again commence to force the bars under the cutter, as above explained.

In order to facilitate the cutting and handling of the bars, I cast several bars or rods of solder V V V to one end cross-bar, W, similar to gridiron with one end removed. This casting I make wide enough to lie snugly upon the bottom of the box in front of the follower-block. The fingers or bars will then be moved forward simultaneously under the cutter until they are all cut up. We thus provide a very simple and complete machine for cutting solder, so that the work can be very expeditiously done.

Having thus described our invention, what we claim, and desire to secure by Letters Patent, is—

1. The box A, with its slotted standards D D, for guiding the head E with its cutter C, and having the stop and gage-bar I and apron or chute O, in combination with the block or follower J, connecting-bar K, and spring-lever L, substantially as and for the purposes described.

2. In combination with the sliding head or follower J, connecting-bar P, and pinion Q, on the driving-shaft, and the centrally-pivoted lift-lever R, operated by treadle S, all combined and arranged to operate substantially as and for the purposes described.

In witness whereof we have hereunto set our hands and seals.

FERDINAND C. SMITH. [L. S.]
  CHARLES E. SMITH. [L. S.]

Witnesses:
 S. L. POLLOCK,
 WM. COLLIER.